Figures 9, 10, 11, 12:
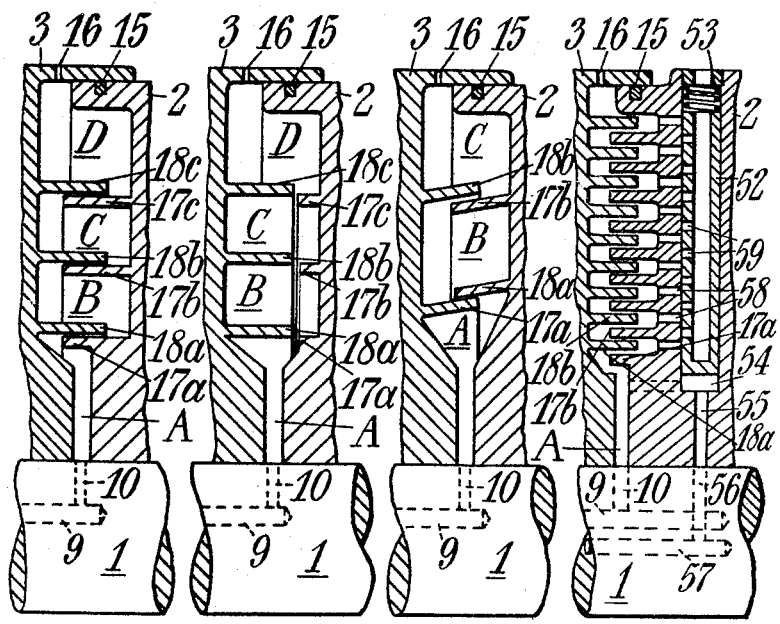

Dec. 8, 1959  T. HINDMARCH  2,916,122
FLUID PRESSURE OPERATED FRICTION CLUTCHES
Filed Aug. 3, 1953  4 Sheets-Sheet 1
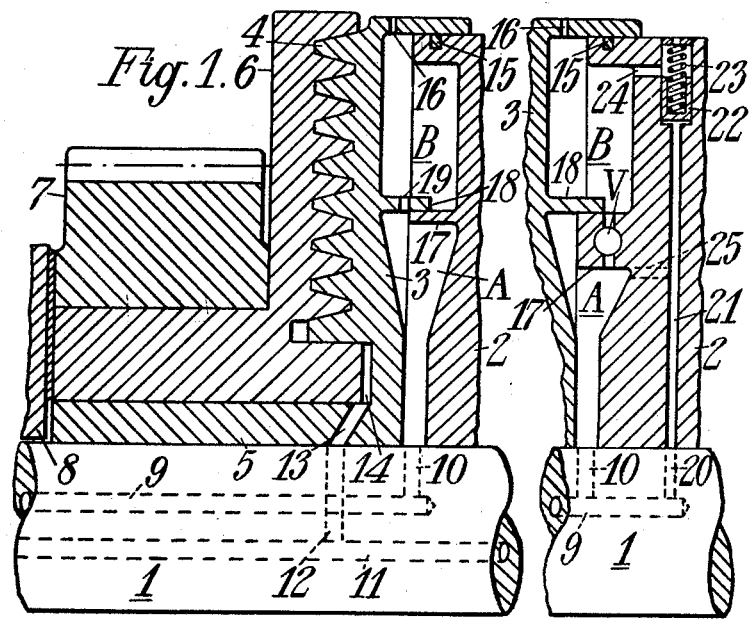
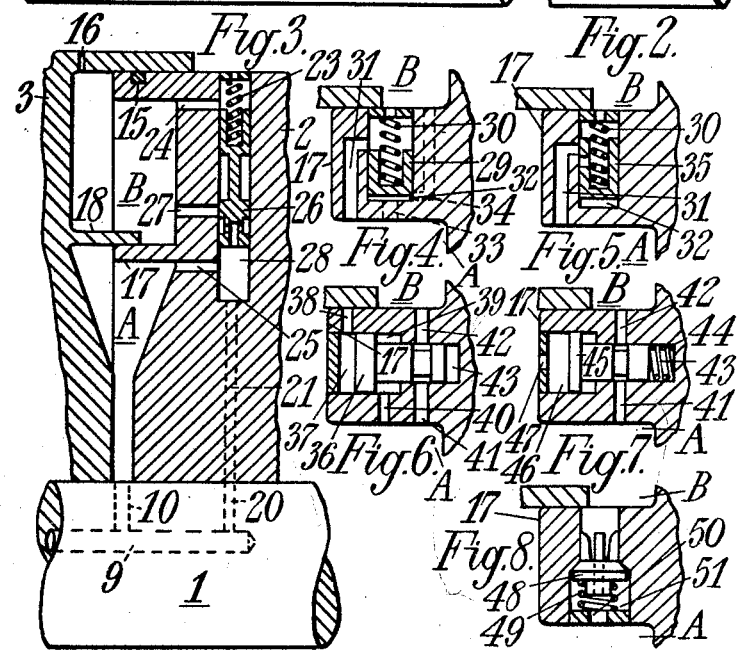
Inventor
T. Hindmarch
By Glascock Downing Auerbach
Attys.

Dec. 8, 1959 T. HINDMARCH 2,916,122
FLUID PRESSURE OPERATED FRICTION CLUTCHES
Filed Aug. 3, 1953 4 Sheets-Sheet 2

Inventor
T. Hindmarch

Dec. 8, 1959                    T. HINDMARCH                    2,916,122
                    FLUID PRESSURE OPERATED FRICTION CLUTCHES
Filed Aug. 3, 1953                                            4 Sheets-Sheet 3
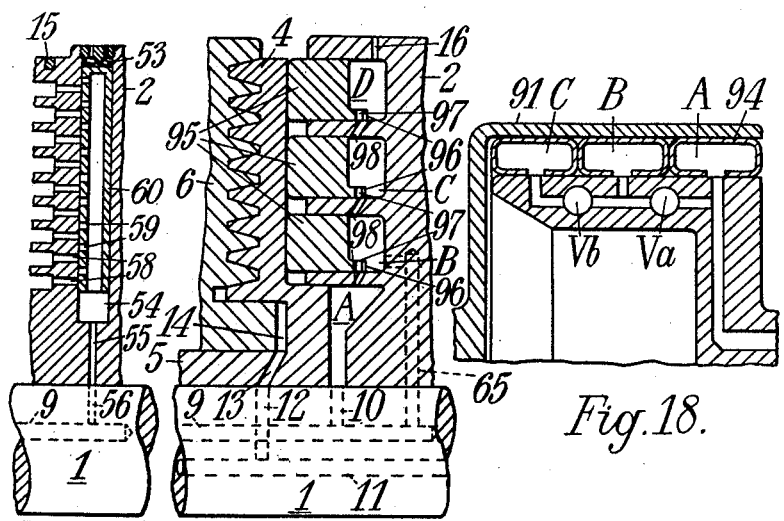
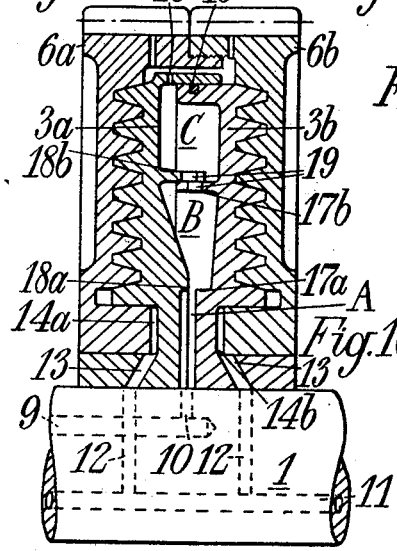
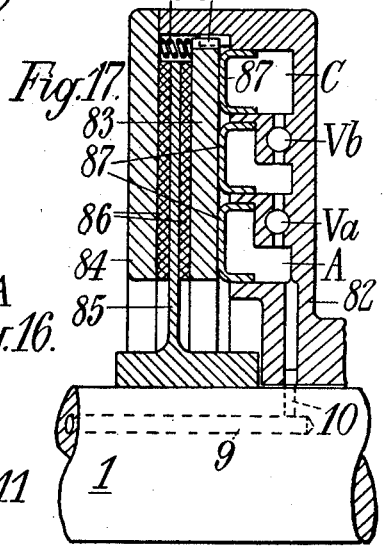
Inventor
T. Hindmarch

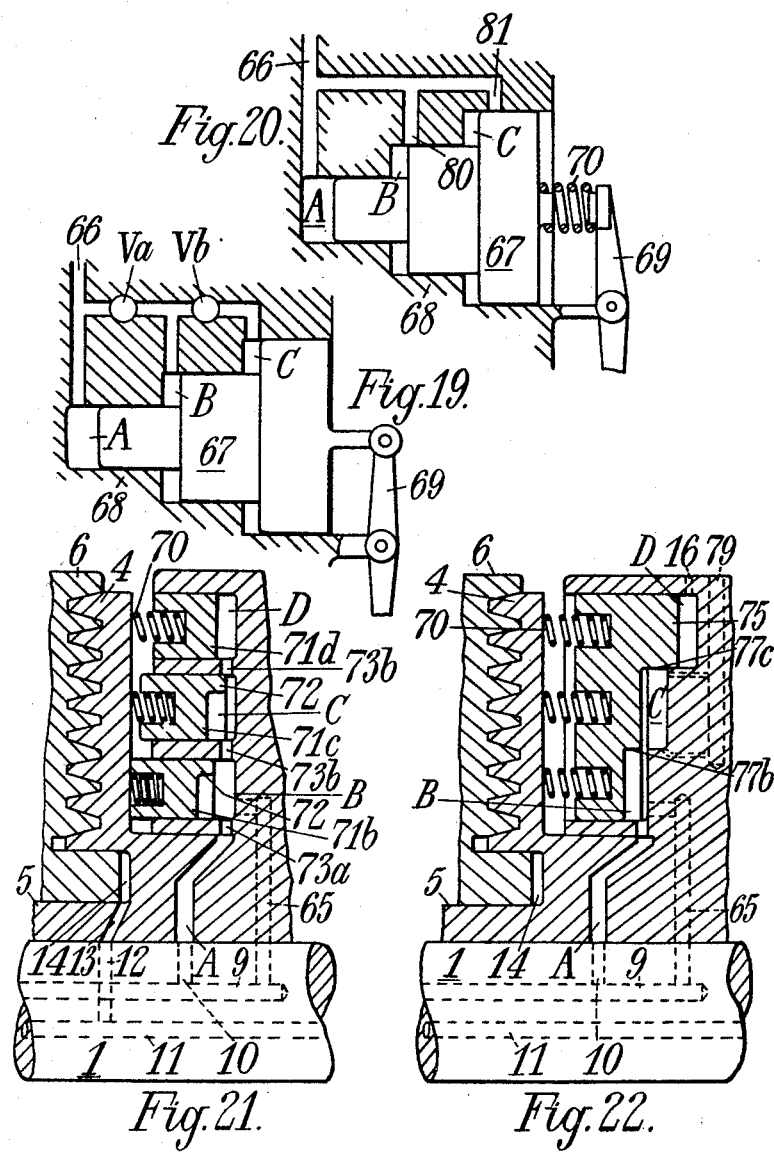

United States Patent Office 2,916,122
Patented Dec. 8, 1959

2,916,122

FLUID PRESSURE OPERATED FRICTION CLUTCHES

Thomas Hindmarch, Chesham, England

Application August 3, 1953, Serial No. 371,849

Claims priority, application Great Britain August 13, 1952

2 Claims. (Cl. 192—85)

This invention relates to fluid pressure operated friction clutches or couplings and particularly but not exclusively to those having a fluid pressure chamber which rotates with one of the members of the clutch or coupling.

The object of the present invention is to provide a clutch or coupling for use in power transmissions by means of which the rate of engagement or disengagement and/or control of the torque carrying capacity may be controlled at varying speeds.

It is well known that over a wide range the torque carrying capacity of a given clutch is substantially proportional to the pressure exerted between the engaging faces, and as for any given clutch the area of friction engagement is substantially constant. In a fluid pressure operated friction clutch, this force is proportional to the fluid pressure multiplied by the area over which the fluid pressure operates. The torque carrying capacity of the clutch can therefore be made to vary as required by either varying fluid pressure, varying the area over which the fluid pressure is applied, or by a combination of both.

It is also well known that in a fluid pressure operated friction clutch in which the fluid pressure chamber rotates with the clutch, the pressure developed due to the rotation of the fluid is substantially proportional to the square of the tangential speed of the fluid at the point being considered. This pressure, which herein will be referred to as the centrifugal pressure, is independent of and additional to the applied pressure, and this centrifugal pressure will be substantially proportional to the square of the rotational speed multiplied by the square of the radius at the point being considered.

The total engaging force is therefore substantially proportional to the sum of the applied pressure and the integral of the centrifugal pressures from the inner to the outer radius of the operating chamber.

The invention consists in a pressure fluid operated friction clutch or brake comprising at least two interengageable friction members, at least two pressure chambers which are expansible under fluid pressure to cause relative movement between said interengageable friction members, fluid channel means of restricted cross sectional area connecting at least one chamber with at least one other chamber to allow controlled passage of fluid between said chambers, and supply means connecting one of said fluid chambers with the exterior of the clutch or brake.

A further feature of the invention is that the rate of flow through the restricted orifice or restricted orifices is controlled by valve means.

Figure 15:
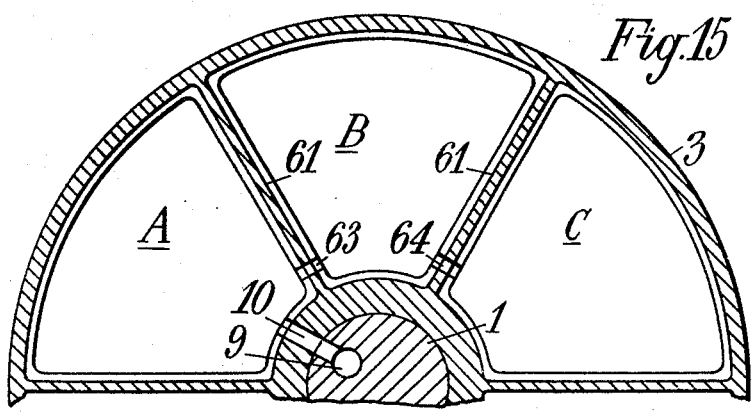

The accompanying drawings show, by way of example only, a number of embodiments of the invention in which:

Figure 1 is a longitudinal section of a clutch having two circumferential chambers, Figure 2 is a longitudinal section of a clutch having two circumferential chambers and showing a relief valve, Figure 3 is a longitudinal section of a clutch having two circumferential chambers and showing a further relief valve, Figures 4 to 8 are details of various relief valves, Figures 9 and 10 are longitudinal sections of clutches having three circumferential chambers, Figure 11 is a further section of a clutch with two chambers, Figure 12 is a longitudinal section of a clutch having a plurality of chambers, Figure 13 is an alternative arrangement of a valve for the clutch of Figure 12, Figure 14 is a longitudinal section of a further clutch having three circumferential chambers, Figure 15 is a transverse section of a clutch with radial chambers, Figure 16 is a longitudinal section of a double clutch, Figure 17 is a longitudinal section of a friction plate clutch or brake, Figure 18 is a longitudinal section of a drum brake, Figures 19 and 20 are longitudinal sections of a clutch with stepped pistons, and Figures 21 and 22 are longitudinal sections showing the application of springs to the clutch operating member.

While the invention may be applied to many types of clutch, I shall in the main describe its application to the type of clutch described in my British specification No. 622,153.

In all the embodiments illustrated, the clutch is shown in the engaged position, except in those embodiments shown in Figures 19 to 22 inclusive, where it is shown in the partially engaged position.

In one form of construction shown in Figure 1 the clutch is provided with two annular and concentric chambers A, B between a fixed abutment plate 2 positioned at right angles to a shaft 1 and a further plate-like member 3 forming one of the friction members of the clutch which is splined to the shaft 1 and capable of longitudinal movement to engage a further friction plate 6 which is free to rotate on a hub 5 on the shaft 1 and by means of which the drive is imparted to the shaft when the clutch is engaged.

The outer periphery of the two plates forming the sides of the chambers are closed around their periphery by overlapping concentric rings one on each plate in the manner as described in my British specification No. 622,153, and sealed by a sealing ring 15. More specifically, the abutment plate 2 is provided with a peripheral flange 100 and the plate-like member 3 with a periperal flange 100a. The boundary between the two chambers comprises overlapping spigot-like cylindrical concentric rings 17 and 18. The one engaging friction plate is provided with V-shaped annular grooves 4 and projections which engage with corresponding grooves and projections on the other plate 6. The plate 6 which is free to rotate on the shaft is drivingly connected, for instance, to a pinion 7 through which the drive is transmitted and which has a thrust resisting member 8 adjacent thereto.

The fluid pressure chambers A, B are separated by the cylindrical spigots 17, 18, while one or more bleed holes 16 are provided in the outer periphery of the member 3 of the chamber B. One or more similar holes 19 are provided in the spigot 18, so arranged that they are uncovered when the clutch is in the engaged position, but are closed when the clutch is in the disengaged position by the movement of the longitudinally movable plate 3 to the right under the action of fluid pressure supplied to a disengaging pressure chamber 14 through fluid ways 11, 12 and 13. Starting with the clutch in the disengaged position, fluid under pressure is supplied through fluid ways 9, 10 in the shaft to the inner A of the two chambers causing the longitudinally movable member 3 to move and the clutch faces to engage under light pressure. Holes 19 in the spigot 18 are then uncovered and fluid then flows into the outer chamber B and the pressure in this chamber builds up more slowly than that in the first chamber A owing to the restriction of the holes 19. When the restriction of the holes 19 is considerably less than that of the hole 16 in the outer periphery of the outer chamber, the pressure in the outer chamber B eventually builds up to an amount such as would exist if the spigot members 17, 18 were not provided. The rate of bleed through the hole 16 in the outer periphery is of course considerably influenced by the centrifugal pressure existing at the periphery of the chamber B, and owing to the smaller radius, the rate of flow through holes 19 in the spigot 18 is not influenced by centrifugal pressure to such a great extent. It can therefore be seen that by co-relating the sizes of the holes 19 in the spigot and holes 16 in the periphery of the outer chamber B, it is possible to some extent to compensate for the large increase in pressure which occurs in the outer chamber B due to centrifugal action at high speed in the normal form of clutch, where the spigot members are not present. When it is desired to disengage the clutch it is the usual practice to shut off the supply of pressure fluid by way of the channel 9 to the clutch chambers and to open this way to atmosphere, by reason of which a considerable amount of the fluid in the pressure chamber passes back along the shaft, the remaining amount bleeding from holes 16 in the outer periphery. Where the restriction 19 is provided, very little of the fluid in the outer chamber B will be able to pass back in this manner, and sufficient therefore must bleed from the hole 16 in the outer periphery to allow the friction member 3 to move out of engagement. Where a very slow rate of disengagement is permissible, this method is quite satisfactory, but where it is necessary to provide for a rapid disengagement, further means of emptying sufficient fluid from the outer chamber B rapidly to permit of disengagement is provided.

In a form of construction shown in Figure 2, a valve 22, controlled by a spring 23, covers a hole 24 provided between the outer periphery of the outer chamber B and the exterior of the clutch when the clutch is engaged under the influence of pressure fluid supplied from the pressure fluid supply ways either by way of a channel 20, 21 from the channels 9 in the shaft or from the inner chamber by way of the channel 25. When the pressure in the channel 9 in the shaft falls, the valve 22 moves radially inwards under the action of the spring 23 uncovering the hole 24, thus allowing the outer chamber B to empty. In this embodiment, instead of holes 19 as shown one or more valves V are provided in the spigot 17, which may be any of the types which will be described later in reference to Figures 4 to 8, and so arranged that the relationship of the pressures may be arranged as desired.

In a further construction shown in Figure 3 a different type of valve is provided between the periphery of the outer chamber and the outside of the clutch which may be used as an alternative to the valves referred to in the embodiment shown in Figure 2 or may be additional thereto. Fluid pressure is applied through fluid ways 9, 10 to the inner chamber A, causing partial engagement, as previously described. As the pressure in this chamber builds up, fluid passes through a fluid way 25 to a chamber 28 below the valve 26 causing the valve to move radially outwards. This cuts off the passage 24 between the outer chamber B and the outside of the clutch and at the same time opens up an inlet way 27 from the outer chamber B to the chamber below the valve. The radially outward force of the valve 26 is substantially proportional to its mass and the pressure in the chamber 28 below the same, which in turn is proportional to the applied pressure plus the centrifugal pressure existing at this radius. As the speed increases therefore, the valve moves to a greater radius, partially or completely cutting off the feed way 27 from the outer chamber B, thus reducing the pressure existing in the chamber 28 below the valve. Instead of supplying this latter chamber from the inner chamber, it may of course, be supplied direct from the channel in the shaft by way of a channel 21 or alternatively from the separate channel provided with an independent means of pressure.

A number of different types of valves may be used, for instance, in the spigot to provide varying ratios of pressure between the two chambers. In one, for example, as shown in Figure 4, the valve member 29 which moves radially outwards under the action of centrifugal force against its control spring 30 partially or fully closes the fluid way 31, thus reducing the rate of flow from the inner A to the outer chamber B. A chamber 32 below the valve may either be supplied with pressure directly through a fluid way 33 from the inner chamber A, or by way of a fluid way 34 from the outer chamber, or alternatively may be vented to atmosphere so as to provide the characteristics required.

As an alternative, as shown in Figure 5, a valve 35 is provided which will produce the opposite effect, i.e. under the action of centrifugal force, the fluid way 31 between the chambers is uncovered, thus allowing a greater rate of flow from the inner A to the outer chamber B.

In another construction shown in Figure 6 the valve 36 is arranged parallel to the axis of the clutch, so that centrifugal force, due to the mass of the valve, has no effect on its operation. It may, of course, be arranged radially if the effect of centrifugal force is required, and in addition control springs may be fitted if necessary. Pressure from the inner chamber A through a fluid way 40 from this chamber acts on a small area of the valve in chamber 39. A larger area of the valve in the chamber 37 communicating with the outer chamber B by way of the hole 38 responds to the pressure in the chamber B. If the pressure in the outer chamber B builds up to more than a predetermined proportion of the pressure existing in the inner chamber A the valve moves to the right, cutting off the flow of fluid through ways 41 and 42 and vice versa. Working space 43 of the valve may be vented or led to any other desired pressure point to modify the characteristics.

Figure 7 shows a form of construction similar to the valve 45 which is influenced only by the pressure in the inner chamber A. When this builds up in the valve chamber 46 by way of the hole 47 against the action of a spring 44 to the required amount, fluid ways 41 and 42 are connected, thus allowing fluid to pass from one chamber to the other.

Figure 8 shows how a non-return valve 48 may be provided by which fluid can pass rapidly from the outer chamber B to the inner chamber A by way of the hole 50 during disengagement, but when the valve is closed by the spring 49 it does not permit of any flow from the inner chamber to the outer chamber. Alternatively, a restricted way 51 may be provided in the valve 48, permitting a small rate of flow from the inner chamber to the outer chamber.

In an alternative form of clutch shown in Figure 9 the pressure chamber is formed in four sections, divided by the spigot members 17a, b and c and 18a, b and c and arranged so that they overlap but do not actually touch, and permit a predetermined rate of flow past them, the gap between them remaining constant where the clutch is in the fully engaged position or nearing engagement, while in a further arrangement shown in Figure 10 the spigots 17a, b and c and 18a, b and c are arranged so that they slide on one another and seal the passage between one chamber and the next. When the clutch is disengaged and the pressure fluid is supplied to the inner chamber A, the movable member moves comparatively rapidly as it is only a small volume of the inner chamber that has to be filled. Gaps are provided between the ends of the spigots as the clutch engages, that between the inner pair 17a and 18a being larger than that between the outer pair 17c and 18c, the gap on the intermediate spigots being of intermediate size. The gaps between the first pair of spigots opens first permitting some flow into the second chamber B, then the gap between the second and third spigots opens next and finally the gap between the third and fourth chambers. The spigots may be formed as part of a cone as shown in Figure 11 and thus be arranged to provide a gap between them which varies with the position of the moving member of the clutch depending on whether the one member is inward or outward in respect of the other, the gap between the first pair 17a and 18a being arranged to decrease in size with engagement of the clutch while the gap between the second pair 17b and 18b increases under the same conditions.

A labyrinth construction as shown in Figure 12 may be provided by having a plurality of interleaved spigots alternately attached to the opposite members and spaced equally from one another and thus arranged that the rate of bleed from the inner to the outer radius of the clutch is comparatively slow. It will be realised, of course, that the rate of disengagement of this construction will be slow and when this cannot be permitted a radially moving valve 52 having a long chamber connecting with the exterior of the clutch and connected by exhaust ways 59 with each of the spaces between the fixed spigots may be provided. The valve is held radially inwards by the action of a spring 53 to cover the various exhaust ways 58 leading to the chamber in the valve. The valve is moved outwards by fluid pressure applied to a chamber 54 at the end of the movable part of the valve by a fluid way from the innermost chamber A, or alternatively, by fluid ways 55 and 56 in the shaft which may be supplied from the same or different 57 pressure sources of fluid pressure as the clutch. When therefore, pressure is applied, the valve will move radially outwards and cut off the exhaust ways 58, but when this applied pressure falls, the valve will move radially inwards, permitting a rapid exhaust of the fluid and hence rapid disengagement. In some cases, the labyrinth construction may be applied solely for purposes of controlling the torque carrying capacity of the clutch with varying speed, and in some of these cases it may be necessary for the engagement of the clutch to be much more rapid than would be possible by supplying the fluid only to the innermost chamber A. When this is required, the valve chamber may be closed to the exterior of the clutch.

In Figure 13 of the valve 60 is held radially inwards by a spring 53 and is so arranged that when the pressure in chamber 54 below the valve member is low, exhaust ways 58 are connected. When the pressure fluid is first applied, the flow is rapid to all the chambers, thus permitting rapid engagement of the clutch, but as the pressure builds up, the valve 60 moves radially outwards, cutting off the additional supply of fluid. Alternatively, it may be arranged so that the valve 60 is only partially, or is not influenced by the pressure in the chamber 54 below the valve and does not move outwards except under the influence of centrifugal force. In all the applications described so far, the fluid pressure has been shown acting directly on one member of the clutch. It is desirable in certain circumstances to interpose other means such as annular pistons 95 shown in Figure 14 between the members. In this form of construction the fixed chamber plate is provided with concentric cylindrical spigots which form annular chambers. These chambers are all fitted with ring-shaped piston like members 95, ports 97 and 98 being provided through the spigots by which the fluid is allowed to enter behind the rings to urge them to press against the movable plate friction member to engage the clutch. The inner surface of the friction plate forms part of the boundary of the innermost chamber and therefore the initial pressure acts directly on this to move the clutch the initial engaging distance. These pistons may be provided with projections 96 which co-act with the ports and control the flow of fluid from one chamber to the next. The fluid pressure may originally be supplied from the fluid way 9 in the shaft to the first chamber A where it acts directly on the movable friction member 4, or alternatively may be supplied by a fluid way 65 direct to the second chamber B.

Instead of the pressure chamber being divided into a series of concentric chambers, it may be divided by radial division into a series of segmental chambers as shown in Figure 15. Fluid pressure is supplied initially to a first chamber A, thence via a port 63 in the radial wall 61 between chambers to the second chamber B, to a further port 64 and to a third chamber C. Any number of chambers may of course be provided and any proportion of them supplied at one time. It will in general, be preferable to supply at least two diametrically opposite chambers at the same time, so as to preserve dynamic balance.

In the constructions described so far, most of the description has related to pressure fluid being supplied first to one chamber and then flowing sequentially to the remaining chambers. It will be realised of course, that the chambers may be divided into two or more groups, and each group fed from the same or a different pressure means.

Figure 16 shows how the invention may be applied to the more conventional double sided clutch having movable friction members on both sides of the chambers A, B and C in which the pressure fluid flows into an inner chamber A, causing the two movable clutch members 3a and 3b to move into engagement with their associated fixed members 6a and 6b rapidly under light pressure. The movable members are provided with co-acting spigots 17a and 18a which overlap until the engaging faces are almost in contact. The spigots 17b and 18b have ports 19 arranged in them, which close partially but not completely as the clutch moves into engagement, thus forming a restriction of the flow from the inner B to the outer chamber C. When disengagement is required and the inner members 3a and 3b move together, these ports 19 tend to open, thus permitting the fluid in the outer chamber B to escape radially outwards after the gap between 17a and 17b has been closed. It will be realised of course, that any of the valve arrangements previously described may equally well be applied to clutches of this construction. Where the pressure chamber is divided up by a series of spigots, these spigots may of course be of a flexible nature or there may be any combination of rigid and flexible spigots, the flexibility of the spigots being so controlled that under the influence of pressure and/or centrifugal force, the required gap between them is obtained.

The invention may also be applied to a conventional single plate clutch as shown in Figure 17 in which movable plate members 83 and 84 move towards one another to embrace and hold a friction plate 85 drivingly connected to the shaft 1 supporting it, which plate will usually be of a flexible construction or be slidingly mounted on the shaft. Friction faces 86 will in general be fixed to the clutch disc 85. There are two corresponding engagement faces, one of which 84 is firmly attached to the main body 82 of the clutch, while the other 83 is slidably mounted but drivingly connected to the body 82 by means of splines 89 or like means. Springs or other resilient means 88 may be provided for disengagement. The main body 82 is mounted so that it can rotate freely on the shaft 1, and contains three pressure chambers A, B and C. The chambers are sealed by flexible sealing channel rings 87 rather like the pistons previously described which bear on the disc 83. Pressure fluid being supplied by fluid ways 9, 10 to the inner chamber A causes the flexible sealing means 87, to expand, thus causing partial engagement of the clutch. The fluid pressure then passes through a valve means V*a* between the first and second chambers to the second chamber B and finally through valve means V*b* to the third chamber C, these valve means being one or any combination of the valve previously described.

The invention may be applied as shown in Figure 18 to the flexible type drum clutch in which flexible annular pressure chambers A, B and C formed by the flexible members 94, are provided around the drum 91 interconnected by valves V*a* and V*b*, the action of which is very similar to that of the construction previously described in respect of Figure 17.

Figure 19 shows a stepped piston 67 presenting pressure surfaces of varying area mounted in a stepped cylinder 68 so as to be used to apply the pressure to the engaging faces, for instance by means of a toggle 69. Pressure fluid is supplied by a fluid way 66 to a chamber A at the smaller end of the piston, thence by a valve V*a* to a chamber B at the first step and finally through another valve V*b* to a chamber C at the second step, causing the desired rate of build up of pressure on the engaging faces. Where more than one piston is used, the valve means may of course be common to each or all pistons. A spring 70 may be interposed between the piston and the toggle as shown in Figure 20. In this case, fluid pressure causes a movement of the piston 67, bringing the engaging faces together, and causing a slight compression of the spring. The ports entering the various chambers may be staggered in relation to the steps as shown at 80 so that the latter uncover them progressively as the pressure fluid flows into the second chamber B, causing a further compression of the spring until the third port 81 is uncovered, and fluid pressure flows into the third chamber C, building up the final pressure.

The spring principle may be applied to a construction as previously described in relation to Figure 14 as having ring pistons and is shown in Figure 21. Fluid pressure may be applied to an initial chamber A or alternatively directly to the chamber B by way of the channel 65, which then moves piston 71*b* to the left, compressing the spring between the piston and the friction plate 4 and uncovering projection 72 from the port 73*b*, thus allowing the fluid to pass to the second chamber C and so on.

This may be modified by using only one piston 75 which is stepped at 77*b* and 77*c* as shown in Figure 22, and the action is then similar to that described with reference to the stepped piston of Figure 20. It will be realised that the spring arrangement may be applied to many of the previous constructions if the member on which the friction plate is acting can move against the action of a spring or other resilient means.

It will be clear that the system as set forth in the foregoing description may be used to control the disengagement of fluid pressure operated clutches and furthermore it can be used to control both the engagement and disengagement of such clutches by the provision of appropriate pressure chambers or sets of pressure chambers as required.

It is to be understood that the constructions hereinbefore described are for example only and various details for carrying the invention into effect may be varied without departing from the scope of the invention.

I claim:

1. A friction clutch comprising an axially movable friction element, a rotatable but axially immovable friction element with which the movable element is engageable, means cooperable with the movable element to define therebetween an expansible pressure cavity forming a closed container in both the engaged and disengaged positions of the friction elements, complemental means on the movable friction element and said cooperable means defining at least two concentric fluid sealing chambers within said container, means to introduce fluid into the container whereby the movable friction element engages the immovable friction element, due to movement of the movable element away from the cooperable means, further means controlling the passage of fluid from one chamber to the other chamber to control the rate of engagement, and additional control means associated with one of said chambers whereby interference arising from centrifugal pressure of fluid within the clutch, with engagement characteristics is lessened.

2. A friction clutch comprising a shaft, an axially movable friction element on the shaft, a rotatable but axially immovable friction element on the shaft with which the movable element is engageable, an abutment element on the shaft spaced from the movable element having a peripheral flange, a peripheral flange on the movable friction element overlying the flange of the abutment element whereby the abutment element and the movable friction element define a cavity therebetween, a ring extending into the cavity from the abutment element, a ring extending into the cavity from the movable clutch element and slidable on the ring of the abutment element whereby said rings form two concentric fluid sealing chambers within the cavity, means to introduce fluid into the cavity whereby the movable friction element is moved away from the abutment element into engagement with the immovable friction element, means associated with one of said rings controlling the passage of fluid from one chamber to the other chamber to control the rate of engagement, and further means in the flange of the movable friction element cooperable with the outer chamber whereby interference arising from centrifugal pressure of the fluid within the clutch, with engagement characteristics is lessened.

References Cited in the file of this patent

UNITED STATES PATENTS

| | | |
|---|---|---|
| 2,289,991 | Paxman | July 14, 1942 |
| 2,583,919 | Wilson | Jan. 29, 1952 |
| 2,632,544 | Hockert | Mar. 24, 1953 |
| 2,642,844 | Flinn | June 23, 1953 |

FOREIGN PATENTS

| | | |
|---|---|---|
| 564,638 | Great Britain | Oct. 6, 1944 |
| 622,153 | Great Britain | Apr. 22, 1949 |
| 654,453 | Great Britain | June 20, 1951 |